(12) United States Patent
Imano et al.

(10) Patent No.: US 9,187,877 B2
(45) Date of Patent: Nov. 17, 2015

(54) MACHINE BODY AND MACHINERY

(71) Applicant: CATERPILLAR SARL, Geneva (CH)

(72) Inventors: Toru Imano, Tokyo (JP); Akito Nakai, Tokyo (JP); Shinichi Nishiyama, Hyogo (JP)

(73) Assignee: Caterpillar SARL, Geneva (CH)

( * ) Notice: Subject to any disclaimer, the term of this patent is extended or adjusted under 35 U.S.C. 154(b) by 0 days.

(21) Appl. No.: 14/403,035

(22) PCT Filed: May 13, 2013

(86) PCT No.: PCT/JP2013/063250
§ 371 (c)(1),
(2) Date: Mar. 19, 2015

(87) PCT Pub. No.: WO2013/175981
PCT Pub. Date: Nov. 28, 2013

(65) Prior Publication Data
US 2015/0184361 A1  Jul. 2, 2015

(30) Foreign Application Priority Data

May 22, 2012 (JP) .................................. 2012-116877

(51) Int. Cl.
*B60K 13/04* (2006.01)
*E02F 9/08* (2006.01)
*E02F 9/18* (2006.01)
*F01N 3/20* (2006.01)
*F01N 3/035* (2006.01)
(Continued)

(52) U.S. Cl.
CPC .............. *E02F 9/0866* (2013.01); *E02F 9/0883* (2013.01); *E02F 9/18* (2013.01);
(Continued)

(58) Field of Classification Search
CPC ........ B60K 11/00; B60K 11/06; B60K 13/04; E02F 9/0866; E02F 9/0833; E02F 9/18; F01N 13/082; F01N 3/2066; F01N 2260/022; F01N 2270/02; F01N 2270/08; F01N 2470/30; F01N 2560/026; F01N 2590/08; F01N 2610/11; F01N 3/035; F01N 3/08; F01N 3/24; F01N 2610/02; Y02T 10/24
See application file for complete search history.

(56) References Cited

U.S. PATENT DOCUMENTS 5,987,885 A * 11/1999 Kizer et al. ...................... 60/298
6,810,661 B2 * 11/2004 Lambert et al. ................. 60/286
(Continued)

FOREIGN PATENT DOCUMENTS

JP  2005-105913 A  4/2005
JP  2008-232089 A  10/2008
(Continued)

OTHER PUBLICATIONS

International Search Report from Application No. PCT/JP2013/063250; filed May 13, 2013.

*Primary Examiner* — Hau Phan
*Assistant Examiner* — Jacob Meyer
(74) *Attorney, Agent, or Firm* — BakerHostetler (57) ABSTRACT

Provided is a machine body capable of preventing thermal decomposition of a liquid reducing agent in a reducing agent injector. The machine body includes an exhaust gas treatment device that reduces nitrogen oxides in exhaust gas of an engine provided within a machine room, and a reducing agent supplier that supplies the liquid reducing agent to the exhaust gas treatment device. The exhaust gas treatment device includes a reducing agent injector that injects the liquid reducing agent supplied from the reducing agent supplier, and a cooling fan that is installed in the vicinity of the reducing agent injector so as to face the reducing agent injector. The cooling fan performs cooling by blowing cooling wind of external air, which is taken in from the outside of the engine room, against the reducing agent injector and its upstream side.

5 Claims, 5 Drawing Sheets

(51) Int. Cl.
*F01N 3/08* (2006.01)
*F01N 3/24* (2006.01)

(52) U.S. Cl.
CPC ............... *F01N 3/035* (2013.01); *F01N 3/08* (2013.01); *F01N 3/2066* (2013.01); *F01N 3/24* (2013.01); *F01N 2260/022* (2013.01); *F01N 2610/02* (2013.01); *F01N 2610/11* (2013.01); *Y02T 10/24* (2013.01)

(56) References Cited

U.S. PATENT DOCUMENTS

| | | | |
|---|---|---|---|
| 8,206,476 B2 * | 6/2012 | O'Neil Batzold et al. | 55/385.3 |
| 8,516,800 B2 * | 8/2013 | Liu et al. | 60/286 |
| 8,919,469 B2 * | 12/2014 | Shatters et al. | 180/68.1 |
| 2005/0247050 A1 * | 11/2005 | Kaboord et al. | 60/286 |
| 2008/0307967 A1 * | 12/2008 | Coates et al. | 95/193 |
| 2013/0014496 A1 * | 1/2013 | Fogg | 60/320 |
| 2014/0199212 A1 * | 7/2014 | Herzberg | 422/173 |

FOREIGN PATENT DOCUMENTS

| | | |
|---|---|---|
| JP | 2009-13845 A | 1/2009 |
| JP | 2009-41370 A | 2/2009 |
| JP | 2009-184558 A | 8/2009 |
| JP | 2009-250168 A | 10/2009 |
| JP | 2010-285814 A | 12/2010 |
| WO | 2011-057077 A1 | 5/2011 |

* cited by examiner

MACHINE BODY AND MACHINERY

CROSS-REFERENCE TO RELATED APPLICATIONS

This application is a National Stage of International Patent Application No. PCT/JP2013/063250, filed May 13, 2013, which claims priority to foreign Japanese Patent Application No. 2012-116877, filed May 22, 2012, the contents of which are incorporated herein by reference in their entirety.

TECHNICAL FIELD

The present invention relates to a machine body including an exhaust gas treatment device using a liquid reducing agent, and a working machine including the machine body.

BACKGROUND ART

Although urea water is used as a liquid reducing agent for reducing nitrogen oxides in exhaust gas of an internal combustion engine, when the thermal decomposition temperature of this urea water is about 150° C. and the freezing temperature of the urea water is −11° C. in a urea concentration of 32.5% (trade name: AdBlue), in the related art, this urea water is often arranged in the vicinity of a heat source so as to warm a reducing agent tank for anti-freezing. For example, in terms of vehicle layout, the reducing agent tank may be arranged at a side of a high-temperature object, such as an engine.

A reducing agent injector is installed in the vicinity of an exhaust pipe, such as a muffler, from the feature of an exhaust gas treatment device, and consequently, the temperature of the reducing agent injector itself also becomes high.

In traveling vehicles, such as a truck, the reducing agent injector, the muffler, or the like, is cooled by wind during traveling. However, in machineries that perform stationary work, such as a hydraulic shovel, an engine room is easily filled with heat, and the temperature of the engine room becomes high easily.

When the reducing agent tank is arranged in a place like machine rooms, such as an engine room, of which the temperature becomes extremely high, the thermal decomposition temperature of the urea water is approached and consequently, there is a concern about degradation of performance. If the reducing agent supplied to a fuel injection device is not managed at a suitable temperature, there is a concern that the liquid reducing agent may reach its thermal decomposition temperature before being injected into the exhaust gas treatment device. In areas where the temperature of outside air is high, the need for cooling the liquid reducing agent increases further.

In the related art, in a machine body of a machinery, such as a hydraulic shovel, a tank housing space is provided inside a counter weight adjacent to an engine room, a tank housing room partitioned off from a weight adjusting material within the counter weight by a partitioning member is formed within this tank housing space so as to be openable and closable by a door, the reducing agent tank is fixed within this tank housing room, a communication opening portion that allows the tank housing room and the outside to communicate with each other is provided with a movable louver that opens and closes a communication opening portion, a fan is provided to control the movable louver according to the temperature within the reducing agent tank or the like or to discharge the air within the tank housing room to the outside or introduce outside air into the tank housing room, and the fan is controlled according to the temperature within the reducing agent tank or the like (for example, refer to PTL 1).

CITATION LIST

Patent Literature

[PTL 1] JP-A-2009-250168

SUMMARY OF INVENTION

Technical Problem

In this way, in the related art, the temperature of the liquid reducing agent before being supplied to the reducing agent injector is managed. However, when the liquid reducing agent reaches the high-temperature reducing agent injector, there is a concern that the reducing agent may reach its thermal decomposition temperature and the function thereof cannot sufficiently be exhibited.

The invention has been made in view of such a point, and an object thereof is to provide a machine body capable of preventing thermal decomposition of a liquid reducing agent in a reducing agent injector, and a machinery including the machine body.

Solution to Problem

The invention according to claim 1 is a machine body including a machine room; an engine that is installed within the machine room; an exhaust gas treatment device that is provided within the machine room to reduce nitrogen oxides in exhaust gas; and a reducing agent supplier that supplies a liquid reducing agent to an exhaust gas treatment device. The exhaust gas treatment device includes a reducing agent injector that injects the liquid reducing agent supplied from the reducing agent supplier, and a cooling fan that is installed in the vicinity of the reducing agent injector so as to face the reducing agent injector and blows cooling wind of external air taken in from the outside of the machine room against the reducing agent injector.

The invention according to claim 2 based on the machine body according to claim 1 further includes a temperature detecting device that detects the temperature of the reducing agent injector or its vicinity atmosphere, and a control device that controls the cooling fan according to the temperature of the reducing agent injector or its vicinity detected by the temperature detecting device.

In the invention according to claim 3, the cooling fan in the machine body according to claim 1 or 2 is detachable, and a closing cover is enabled to be installed in a cooling fan installation place instead of the detached cooling fan.

The invention according to claim 4 is a machinery including the machine body according to claims 1 to 3; and a working device that is mounted on the machine body.

Advantageous Effects of Invention

According to the invention of claim 1, since the cooling fan is installed in the vicinity of the reducing agent injector that injects the liquid reducing agent supplied from the reducing agent supplier so as to face the reducing agent injector, and the cooling wind of the external air taken in from the outside of the machine room is blown against the reducing agent injector, the reducing agent injector can be directly cooled by the external air to prevent a concern that the liquid reducing agent may be thermally decomposed in the reducing agent injector.

According to the invention of claim 2, since the control device controls the cooling fan according to the temperature of the reducing agent injector or its vicinity detected by the temperature detecting device, suitable temperature management of the reducing agent injector is enabled while suppressing the energy consumption for cooling the cooling fan. As a result, the injection of the reducing agent injector at an optimal temperature is enabled.

According to the invention of claim 3, since the closing cover is enabled to be installed in the cooling fan installation place instead of the detached cooling fan, it is possible to cope with a concern that the liquid reducing agent may freeze under a low-temperature environment, and excessive cooling can be prevented.

According to the invention of claim 4, in the machinery that does stationary work or low-speed movement work, the machine room is easily filled with heat and the temperature of the machine room becomes high easily, and thus, there is a great effect that the reducing agent injector can be directly cooled by the cooling fan to prevent the liquid reducing agent from being thermally decomposed in the reducing agent injector.

DESCRIPTION OF EMBODIMENTS

Hereinafter, the invention will be described in detail on the basis of an embodiment illustrated in FIGS. 1 to 5 and another embodiment illustrated in FIGS. 6 to 9.

First, the embodiment illustrated in FIGS. 1 to 5 will be described.

Figure 4:
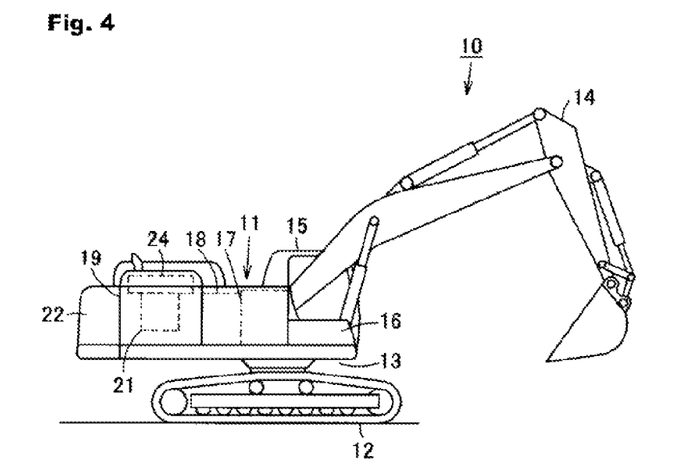
FIG. 4 is a side view of a machinery including the machine body.

As illustrated in FIG. 4, in a hydraulic shovel type machinery 10, a machine body 11 includes a lower traveling body 12, and an upper swivel body 13 that is provided in a swivelable manner at the lower traveling body 12, and a bucket type working device 14 is mounted on the upper swivel body 13 of the machine body 11.

A cab 15 where an operator's seat is provided, and a storage box 16 that houses tools or the like are provided via the working device 14 on the upper swivel body 13. A fuel tank 17 and a hydraulic oil tank 18 are provided behind the storage box 16. An engine 21 is installed in a machine room 19 (engine room) within the machine body 11 located further rearward than a swiveling bearing portion of the upper swivel body 13, and a counter weight 22 is mounted on a rear end of the machine room.

Figure 1:
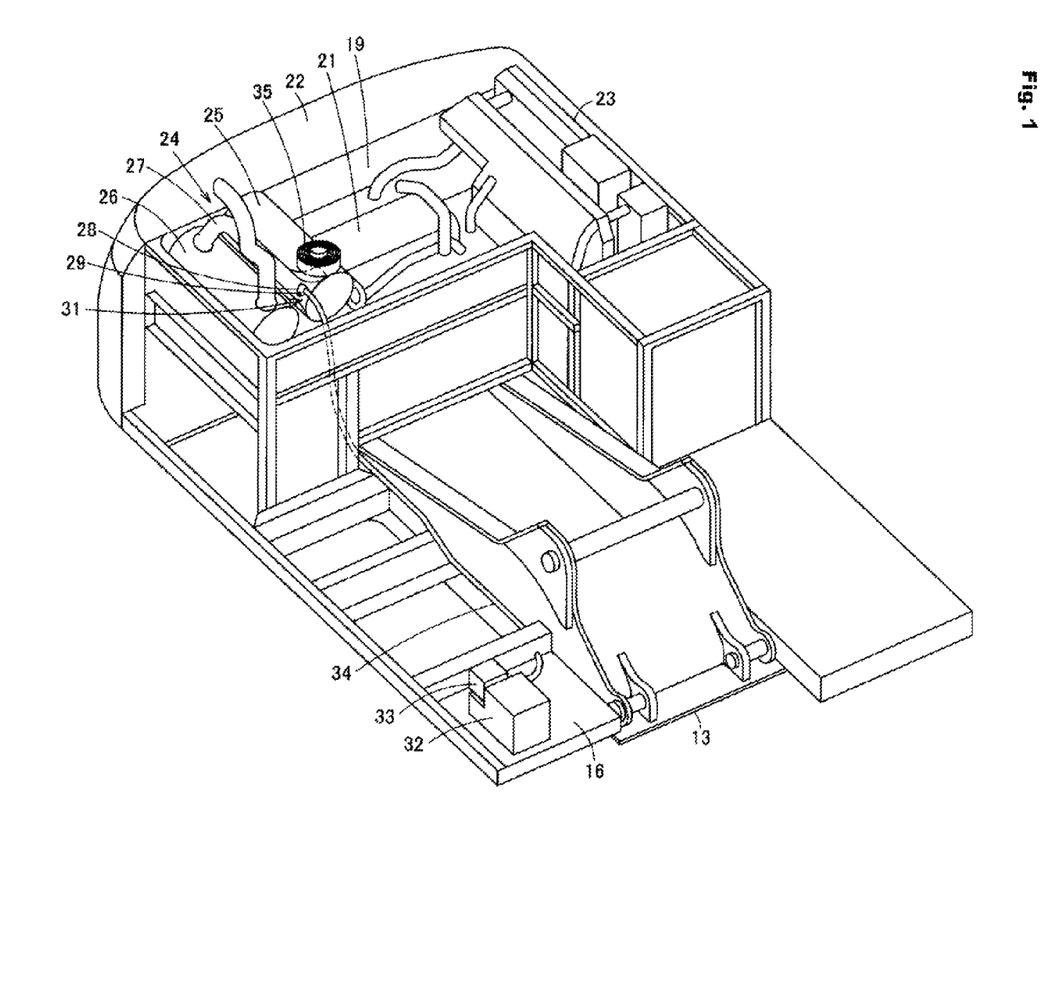
FIG. 1 is a perspective view illustrating an embodiment of a machine body related to the invention.

As illustrated in FIG. 1, a radiator, an oil cooler, and a cooling package 23, such as a cooling fan that applies cooling wind drawn in from the outside to the radiator and oil cooler and cools the radiator and the oil cooler are arranged at one side portion of the engine 21 installed within the machine room 19 of the upper swivel body 13, and an exhaust gas treatment device 24 that performs purifying treatment of exhaust gas with respect to an exhaust system of the engine 21 within the machine room 19 is arranged at the other side portion of the engine 21. Additionally, a plurality of hydraulic pumps (not shown) driven by the engine 21 are arranged in a pump chamber located below the exhaust gas treatment device 24.

The exhaust gas treatment device 24 is provided by connecting a black smoke removal device (Diesel Particulate Filter) 25 that removes black smoke in the exhaust gas, and a nitrogen oxide reducing device (Selective Catalytic Reduction) 26 that reduces nitrogen oxides in the exhaust gas, in series by means of a line 27 in an exhaust gas line. The nitrogen oxide reducing device 26 includes a reducing agent injector 28, such as an injector that injects a liquid reducing agent, such as urea water, in the line 27 on the upstream side thereof The reducing agent injector 28 is provided with a temperature detecting device 29 that detects the temperature of the reducing agent injector 28 or its vicinity atmosphere.

The reducing agent injector 28 provided in the line 27 on the upstream side of the nitrogen oxide reducing device 26 is provided with a reducing agent supplier 31 that supplies the liquid reducing agent, such as urea water, to the nitrogen oxide reducing device 26.

The reducing agent supplier 31 includes a liquid reducing agent tank 32 for reserving the liquid reducing agent, which is installed in the storage box 16 as a position that does not receive a thermal influence of the engine 21, a liquid reducing agent pump 33 serving as a liquid reducing agent supply source that pumps and discharges the liquid reducing agent within the liquid reducing agent tank 32, and a reducing agent supply line 34, such as a urea water supply line (so-called urea line), which is disposed from the liquid reducing agent pump 33 through a pipe line within the machine body 11 to the reducing agent injector 28 of the nitrogen oxide reducing device 26 within the machine room 19.

Figure 2:
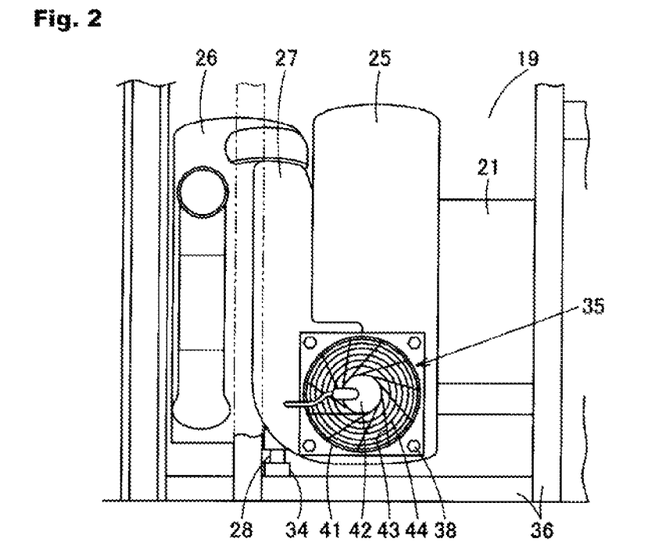
FIG. 2 is a plan view illustrating an exhaust gas treatment device of the machine body.

As illustrated in FIGS. 1 and 2, a cooling fan 35 is installed in the vicinity of the reducing agent injector 28 so as to face the reducing agent injector 28 and its upstream side, and cooling wind of external air taken in from the outside of the machine room 19 is blown against the reducing agent injector 28 and its upstream side by the cooling fan 35.

Figure 3:
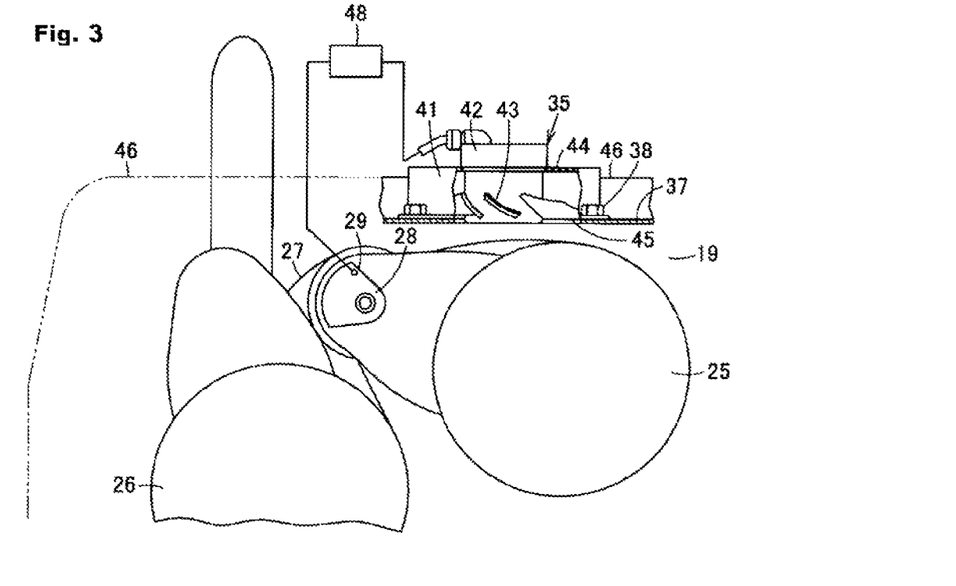
FIG. 3 is a front view illustrating the exhaust gas treatment device of the machine body.

The cooling fan 35 is attached to a frame 36 illustrated in FIG. 2 with a plurality of bolts 38 via an attachment plate 37 illustrated in FIG. 3. The cooling fan 35 can be detached from the attachment plate 37 by removing the bolts 38.

As illustrated in FIG. 3, the cooling fan 35 is configured such that a motor 42 is provided on a casing 41 fixed to the attachment plate 37, and a rotary blade 43 driven by the motor 42 is provided within the casing 41. By rotating the rotary blade 43, external air is sucked from a suction port 44 provided in an upper surface of the casing 41, and cooling wind is blown out from a blow-out port 45 provided in the attachment plate 37 toward the reducing agent injector 28 and its upstream side.

Since the machine room 19, such as an engine room, is provided with a hood 46, a hole for fitting to the casing 41 of the cooling fan 35 is formed in the hood 46.

When the bolts 38 are removed and the cooling fan 35 is detached from the attachment plate 37, the same closing cover (not shown) as the casing 41 is enabled to be installed in the blow-out port 45 of the attachment plate 37 and the hole of the hood 46, that is, in a cooling fan installation place, instead of the detached cooling fan 35. This closing cover has no opening portion unlike the suction port 44.

As illustrated in FIG. 3, a control device 48 that controls the cooling fan 35 according to the temperature of the reducing agent injector 28 or its vicinity detected by the temperature detecting device 29 is provided within, for example, the cab 15 or the like.

The control device 48 performs ON/OFF control or proportional control of the cooling fan 35 according to a detected temperature. The ON/OFF control controls fan driving or stopping depending on a threshold value, and the proportional control controls fan rotation speed according to the temperature.

Figure 5:
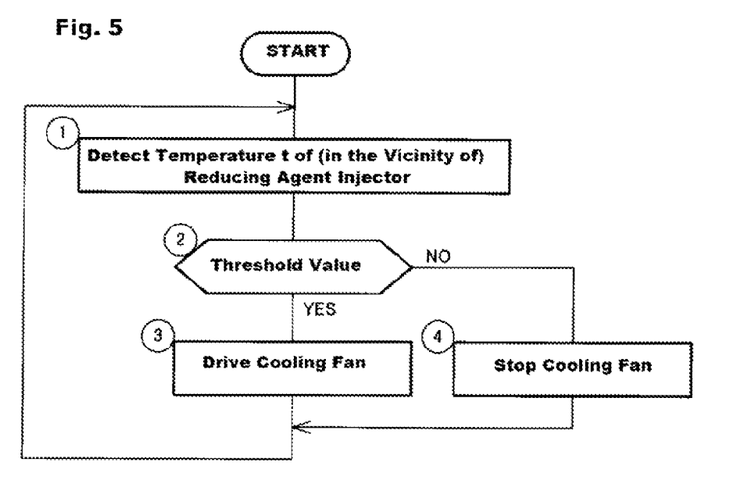
FIG. 5 is a cooling fan control system flowchart for the exhaust gas treatment device of the machine body.

For example, as illustrated in FIG. 5, the temperature t of the reducing agent injector 28 or its vicinity is detected by the temperature detecting device 29 provided at the reducing agent injector 28 (Step 1). In the ON/OFF control, the detected temperature t is compared with a threshold value to (Step 2). When the detected temperature t is equal to or higher than the threshold value to, the cooling fan 35 is driven (Step 3), and when the detected temperature t is lower than the threshold value to, the cooling fan 35 is stopped (Step 4).

Next, the effects of the embodiment illustrated in FIGS. 1 to 5 will be described.

The reducing agent supplier 31 pumps the liquid reducing agent, such as urea water, which is present within the liquid reducing agent tank 32 within the storage box 16, with the liquid reducing agent pump 33, supplies the liquid reducing agent to the exhaust gas treatment device 24 within the machine room 19 through the reducing agent supply line 34, and injects the liquid reducing agent to the upstream side of the nitrogen oxide reducing device 26 with the reducing agent injector 28.

In that case, the temperature of the temperature detecting device 29 or its vicinity is detected by the temperature detecting device 29 provided at the reducing agent injector 28. In the ON/OFF control, the detected temperature is compared with the threshold value, when the detected temperature is equal to or higher than the threshold value, the cooling fan 35 is driven, and when the detected temperature is lower than the threshold value, the cooling fan 35 is stopped. Additionally, in the proportional control, the fan rotation speed of the cooling fan 35 is controlled so as to be increased according to a rise in the detected temperature of the liquid reducing agent, and the temperature of the reducing agent injector 28 is controlled with higher precision by enhancing the capacity for cooling the reducing agent injector 28 and its upstream side.

In this way, since the cooling fan 35 is installed in the vicinity of the reducing agent injector 28 that injects the liquid reducing agent supplied from the reducing agent supplier 31 so as to face the reducing agent injector 28 and its upstream side, the cooling wind of the external air taken in from the outside of the machine room 19 is directly blown against the reducing agent injector 28 and its upstream side, and the reducing agent injector 28 is directly cooled by the external air, a concern that the liquid reducing agent may be thermally decomposed in the reducing agent injector 28 can be prevented.

Since the control device 48 controls the cooling fan 35 according to the temperature of the reducing agent injector 28 detected by the temperature detecting device 29, suitable temperature management of the reducing agent injector 28 is enabled while suppressing the energy consumption for cooling the cooling fan. As a result, the injection of the reducing agent injector 28 at an optimal temperature is enabled.

Particularly, as illustrated in FIG. 4, in the machinery 10 that does stationary work or low-speed movement work, the machine room 19 is easily filled with heat and the temperature of the machine room becomes high easily. Thus, there is a great effect that the reducing agent injector 28 and its upstream side can be directly cooled by the cooling fan 35 to prevent the liquid reducing agent from being thermally decomposed in the reducing agent injector 28.

Next, another embodiment illustrated in FIGS. 6 to 9 will be described. In addition, the same portions as those of the embodiment illustrated in FIGS. 1 to 5 will be designated by the same reference numerals, and the description thereof will be simplified.

Figure 6:
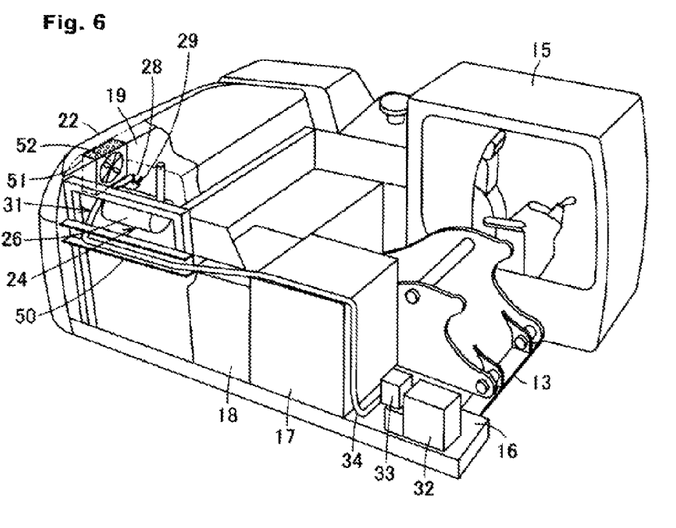
FIG. 6 is a perspective view illustrating another embodiment of the machine body.

That is, the machinery 10 includes the machine body 11, the working device 14 mounted on the machine body 11, the engine 21 mounted on the machine body 11, and the exhaust gas treatment device 24 that is provided with respect to the exhaust system of the engine 21 to reduce nitrogen oxides in exhaust gas.

As illustrated in FIG. 6, the nitrogen oxide reducing device 26 of the exhaust gas treatment device 24 has the counter weight 22 on an upstream side thereof, and includes the reducing agent injector 28, such as an injector, which injects a liquid reducing agent, such as urea water, to the upstream side of the nitrogen oxide reducing device 26, and the temperature detecting device 29 that detects the temperature of the reducing agent injector 28.

The reducing agent injector 28 of the nitrogen oxide reducing device 26 is provided with the reducing agent supplier 31 that supplies the liquid reducing agent, such as urea water, to the nitrogen oxide reducing device 26.

The reducing agent supplier 31 includes the liquid reducing agent tank 32 for reserving the liquid reducing agent, which is installed in the storage box 16 at a position that does not receive a thermal influence of the engine 21, the liquid reducing agent pump 33 serving as a liquid reducing agent supply source that pumps and discharges the liquid reducing agent within the liquid reducing agent tank 32, and the reducing agent supply line 34 that is disposed from the liquid reducing agent pump 33 to the reducing agent injector 28 of the exhaust gas treatment device 24.

The reducing agent supply line 34 passes by upper portions of the fuel tank 17 and the hydraulic oil tank 18, is then drawn into the machine room 19 through a heat-insulating duct formed by a U-shaped cross-sectional member 50 located on one side of the machine room 19 and a sheathing cover plate (not shown) openably and closably attached to one side of the machine room 19, and is connected to the reducing agent injector 28 provided at an inlet side of the nitrogen oxide reducing device 26.

As illustrated in FIG. 6, a recessed groove-like fan mounting groove 51 is formed in the counter weight 22 from an upper surface thereof, and a cooling fan 52 is fitted into the fan mounting groove 51.

The fan mounting groove 51 is located in a place where the cooling fan 52 is installed so as to face the reducing agent injector 28 and its upstream side, in the vicinity of the reducing agent injector 28.

The cooling wind of the external air taken in from the outside of the machine room 19 is blown against the reducing agent injector 28 and its upstream side by the cooling fan 52.

Figure 7:
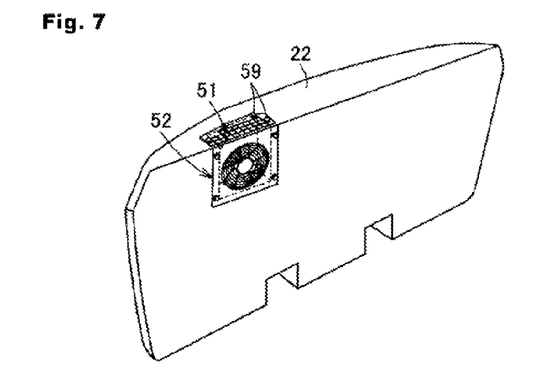
FIG. 7 is a perspective view illustrating a counter weight of the machine body illustrated in FIG. 6.
Figure 8:
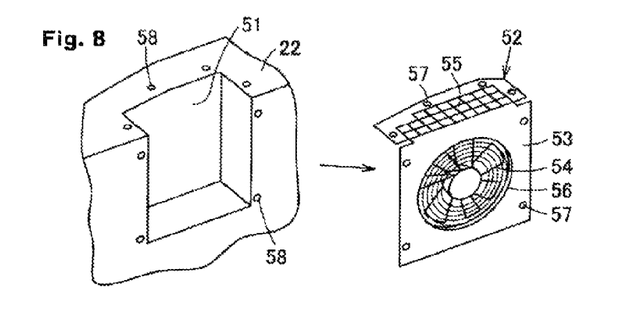
FIG. 8 is an exploded perspective view in a state where a cooling fan illustrated in FIG. 7 is detached.

As illustrated in FIGS. 7 and 8, the cooling fan 52 is configured such that a rotary blade 54 driven by a motor (not illustrated) is rotatably provided at a fan body 53 formed in an inverted L-shape. By rotating the rotary blade 54, external air is sucked from a suction port 55 provided in an upper surface plate portion of the fan body 53, and cooling wind is blown out from a blow-out port 56 provided in a front surface plate portion of the fan body 53 toward the reducing agent injector 28 and its upstream side.

As illustrated in FIG. 8, since peripheral edge portions of the upper surface plate portion and the front surface plate portion of the fan body 53 are provided with a plurality of attachment holes 57 and a peripheral edge portion of the fan mounting groove 51 of the counter weight 22 is also provided with attachment screw holes 58, as illustrated in FIG. 7, the cooling fan 52 is fixed within the fan mounting groove 51 with the plurality of bolts 59 screwed into the attachment screw holes 58 through the attachment holes 57. Accordingly, the cooling fan 52 can be detached from the fan mounting groove 51 by removing the respective bolts 59.

Figure 9:
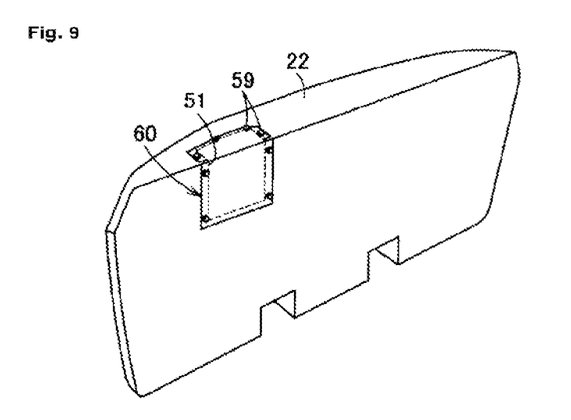
FIG. 9 is a perspective view in a state where a closing cover is attached instead of the cooling fan illustrated in FIG. 8.

A case where the cooling fan 52 is mounted on the fan mounting groove 51 as illustrated in FIG. 7, a case where the cooling fan 52 is removed from the fan mounting groove 51 and the fan mounting groove 51 is used as a mere ventilation hole as illustrated in FIG. 8, and a case where the same closing cover 60 as the fan body 53 is installed instead of the cooling fan 52 as illustrated in FIG. 9 are selected according to the degree of the outside air temperature. The closing cover 60 has no opening portion unlike the suction port 55 and the blow-out port 56 of the fan body 53.

The motor of the cooling fan 52 is also ON/OFF controlled or proportionally controlled according to the detected temperature of the reducing agent injector 28 by the same control device as the cooling fan 35. The ON/OFF control controls fan driving or stopping depending on a threshold value, and the proportional control controls fan rotation speed according to the temperature.

Next, the effects of the embodiment illustrated in FIGS. 6 to 9 will be described.

The reducing agent supplier 31 pumps the liquid reducing agent, such as urea water, which is present within the liquid reducing agent tank 32 within the storage box 16, with the liquid reducing agent pump 33, supplies the liquid reducing agent to the exhaust gas treatment device 24 within the machine room 19 through the reducing agent supply line 34, and injects the liquid reducing agent to the upstream side of the nitrogen oxide reducing device 26 with the reducing agent injector 28.

In this case, the temperature of the reducing agent injector 28 is detected by the temperature detecting device 29, and the ON/OFF control or the proportional control of the cooling fan 52 is performed according to this detected temperature to prevent an excessive temperature rise in the reducing agent injector 28 and prevent the thermal decomposition of the liquid reducing agent jetted on the upstream side of the nitrogen oxide reducing device 26.

In this way, since the cooling fan 52 is installed in the vicinity of the reducing agent injector 28 that injects the liquid reducing agent supplied from the reducing agent supplier 31 so as to face the reducing agent injector 28, and the cooling wind of the external air taken in from the outside of the machine room 19 is blown against the reducing agent injector 28, the reducing agent injector 28 can be directly cooled by the external air to prevent a concern that the liquid reducing agent may be thermally decomposed in the reducing agent injector 28.

Since the cooling fan 52 is controlled according to the temperature of the reducing agent injector 28 detected by the temperature detecting device 29, suitable temperature management of the reducing agent injector 28 is enabled while suppressing the energy consumption for cooling the cooling fan. As a result, the thermal decomposition of the liquid reducing agent in the reducing agent injector 28 can be prevented.

Additionally, the case of FIG. 7 where the cooling fan 52 is mounted, the case of FIG. 8 where the cooling fan 52 is detached, and the case of FIG. 9 where the closing cover 60 is provided can be selected according to the degree of the outside air temperature. Particularly, since the installation of the closing cover 60 in the installation place of the cooling fan 52 is enabled instead of the detached cooling fan 52, it is possible to cope with a concern that the liquid reducing agent may freeze in areas, such as a cold district, where cooling is not required or under a low-temperature environment, such as winter, and excessive cooling can be prevented.

In addition, in the above embodiment, the installation place of the cooling fan 52 is the fan mounting groove 51 of the counter weight 22. However, the installation place is not limited to this place, and may be other places as long as the installation place is in the vicinity of the reducing agent injector 28.

If the invention is a machine body to be driven by an engine, the invention can be applied to machines other than the machinery, for example, can be applied to a transportation machine or the like.

Industrial Applicability

The invention has industrial applicability for those who manufacture or sell machine bodies and machineries.

REFERENCE SIGNS LIST

10: MACHINERY
11: MACHINE BODY
14: WORKING DEVICES
19: MACHINE ROOM
21: ENGINE
24: EXHAUST GAS TREATMENT DEVICE
28: REDUCING AGENT INJECTOR
29: TEMPERATURE DETECTING DEVICE
31: REDUCING AGENT SUPPLIER
35: COOLING FAN
48: CONTROL DEVICE
52: COOLING FAN
60: CLOSING COVER

The invention claimed is:

1. A machine comprising:
a machine room;
an engine installed within the machine room;
an exhaust gas treatment device provided within the machine room to reduce nitrogen oxides in exhaust gas; and
a reducing agent supplier that supplies a liquid reducing agent to the exhaust gas treatment device,
wherein the exhaust gas treatment device includes:
a reducing agent injector that injects the liquid reducing agent supplied from the reducing agent supplier, and
a cooling fan that is installed in the vicinity of the reducing agent injector so as to
face the reducing agent injector and blows cooling wind of external air taken in from outside of the machine room against the reducing agent injector, the cooling fan having a fan body formed in an inverted L-shape including a suction port to take in the external air.

2. The machine according to claim 1, further comprising:
a temperature detecting device that detects a temperature of the reducing agent injector or atmosphere in a vicinity of the reducing agent injector; and
a control device that controls the cooling fan according to the temperature of the reducing agent injector or the atmosphere in the vicinity of the reducing agent injector, as detected by the temperature detecting device.

3. The machine according to claim 1,
wherein the cooling fan is detachable, and a closing cover is enabled to be installed in a cooling fan installation place instead of the detached cooling fan.

4. The machine according to claim 1, further comprising:
a counter weight,
wherein the inverted L-shape of the fan body is removably attachable to the counter weight.

5. The machine according to claim 1, wherein a working device is mountable to the machine.

* * * * *